March 30, 1943.    G. GILBERT    2,315,415
SANITARY MILKING RECEPTACLE
Filed Oct. 12, 1939
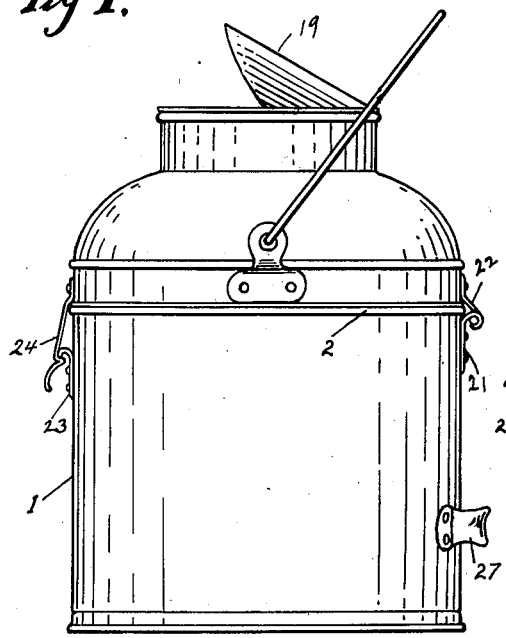
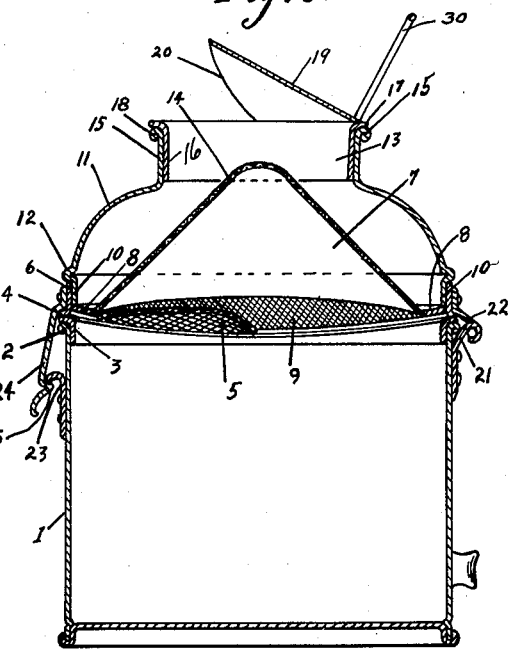
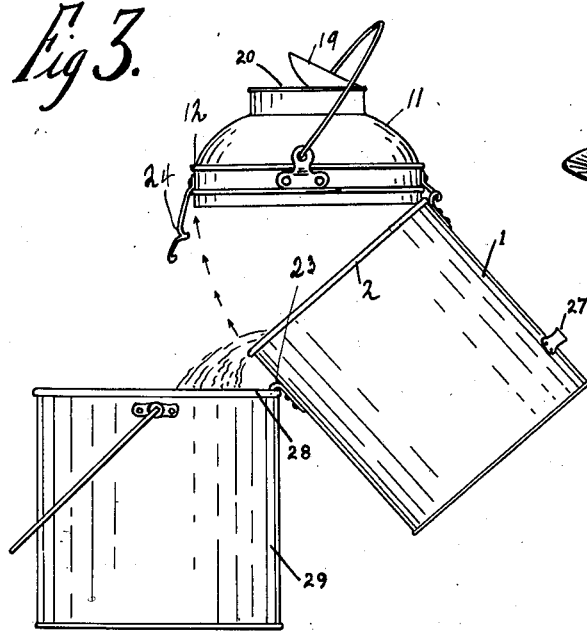
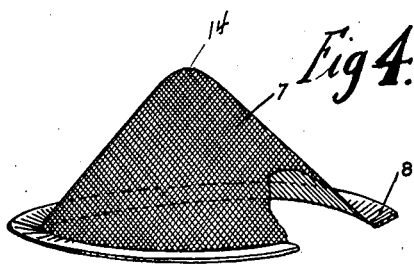
Inventor
George Gilbert,
By Arthur Hawald,
Attorney Patented Mar. 30, 1943

2,315,415

UNITED STATES PATENT OFFICE 2,315,415

SANITARY MILKING RECEPTACLE

George Gilbert, Newport, Ky., assignor of one-half to George Brickler, Alexandria, Ky.

Application October 12, 1939, Serial No. 299,137

4 Claims. (Cl. 31—51)

The present invention relates to sanitary receptacles for receiving milk during the milking process.

During the process of milking a cow into the ordinary receptacles used therefor, it is virtually impossible to prevent dirt, hair, and other foreign substances from dropping from the body of the cow as well as from surrounding objects or from the air into the receptacle. Such substances are not only undesirable in the milk, as foreign substances, but many of them dissolve into the milk either wholly or in part, and will serve to contaminate the same, thus destroying the flavor of the milk and cream and also seriously affecting the keeping qualities thereof. The present invention has for its main object, the obviation of the difficulties mentioned by the prevention of access of such foreign substances into the receiving container.

Further objects of the invention will appear from the following detailed description thereof.

In the drawing:

Figure 1 is an elevation of a receptacle constructed in accordance with this invention.

Figure 2 is an axial section of the container.

Figure 3 is an elevation illustrating the use of the container when pouring milk therefrom into a collector or transportation receptacle.

Figure 4 is a detail of the conical strainer element.

The numeral 1 indicates a cylindrical receptacle constructed of sheet metal of desirable gauge. The upper rim of the receptacle 1 is beaded as shown at 2. Adapted to fit into the receptacle 1 is an annular strainer element 3 having an outwardly extending flange 4 which is adapted to rest on the beaded rim 2 of the receptacle 1. The strainer element 3 has a meshed screen strainer 5 which is concave as clearly shown in Figure 2 of the drawing and which covers the entire upper opening of the receptacle when the element 3 is in position with the flange 4 resting on the rim 2. Secured to the element 3 is a flange 6 extending upwardly above the meshed screen 5, the edge of the screen being permanently secured by the flanges 4 and 6.

The numeral 7 indicates a fine mesh conical screen strainer element which is provided along its lower edge with a rigid rim flange 8 which flares slightly upwardly and is adapted to fit inside the flange 6 secured to the element 3, resting peripherally on the screen 5 as shown in Figure 2. Interposed between the screens 5 and 7 is a filter element 9 consisting of a sheet of sterilized cotton or similar substance.

Adapted to fit slidably into the flange 6 secured to the element 3 is the flange 10 of a domed top section 11 for the receptacle. The flange 10 rests on the flange 8 when the top is in position to retain the conical strainer 7. The section 11 above the flange 10 is provided with a bead 12, which rests on the rim of the flange 6, and the lower edge of the flange 10 abuts against the rim flange 8 of the strainer 7, thus holding the strainer in place. The domed section 11 is provided with a central opening 13, into which the apex 14 of the strainer 7 extends, the opening 13 being surrounded by the upwardly extending flange 15 of the domed section 11. Adapted to fit into the flange 15 is a section 16 which has an annular flange 17 adapted to rest on the rim 18 of the flange 15. Section 16 has a hood 19 which extends partly over the opening of the section 16. Access to the interior, however, is available through the opening 20 under the hood. The screens 5 and 7 are preferably constructed of copper or bronze metal, the screen 7 being of very fine mesh, and the screen 5 being relatively coarse. Riveted on the receptacle 1 is one element 21 of a separable hinge, 22. The other leaf of hinge 22 is secured to the flange 6. On the opposite side of the receptacle 1 is a hook 23 which serves as a keeper for the spring catch 24 which is secured to the flange 6. The lower end of the spring catch is provided with a cam surface 25, so that when the catch is forced downwardly in placing the strainer section 3 on the receptacle, the catch automatically engages the hook 23. The section 26 of the catch further serves as a means whereby the catch may be disengaged from the hook.

The numeral 27 indicates a handle near the lower rear portion of the receptacle which is adapted for use in pouring the milk from the receptacle as shown at Figure 3. A bail 30 is pivotally secured to the element 3.

From the foregoing description, the nature, use, and value of my new device will be apparent to those skilled in the art. When used as a milking receptacle, the hooded element 19 may or may not be employed; however, it is preferable to use the same, as the hood prevents many extraneous substances from gaining access to the strainer element of the receptacle. Such substances as do find access to the strainer element of the receptacle, are first caught by the fine mesh screen 7, and by reason of its conical sloping surface, the solids roll down and rest upon the rim 8 of said screen and may be removed with the screen, it being understood of course, that the screen 7 is readily removable from the strainer section when the domed section 11 is removed. Substances fine enough to pass through the extremely fine mesh of screen 7 will be further filtered by the filtering element of cotton or similar substance 9. It thus becomes apparent that substantially all foreign substances of a solid or semi-solid nature are filtered from the milk as it enters the receptacle 1. It will be seen, therefore, that the milk and cream in the receptacle is substantially free from extraneous or foreign substances, which substances tend to depreciate the quality and flavor of the milk and cream as well as to shorten its keeping qualities. When the receptacle 1 has been filled and the milking has been completed, the strainer element may be hingedly removed from the receptacle, the receptacle 1 being secured on the rim 28 of a collector 29 during the pouring of the milk from the receptacle 1 into the receptacle 29 by means of the hook 23.

Having thus fully described my invention, what I claim as new and desire to secure by Letters Patent, is:

1. A device of the character specified comprising a container, a meshed strainer element hingedly mounted in the top of said container, a conical strainer element removably mounted over said first strainer element, an upwardly flaring flange around the lower edge of said conical element, a domed top section for said container, said top section being open at the top, and a downwardly extending flange on said section arranged to abut the flange on said conical element.

2. A device of the character specified comprising a container, a meshed strainer element hingedly mounted in the top of said container, a conical strainer element removably mounted over said first strainer element, an upwardly flaring flange around the lower edge of said conical element, and a domed top section for said container, said top section being open at the top, a downwardly extending flange on said section arranged to abut the flange on said conical element, and a hooded element adapted to fit over the opening in said domed section.

3. A device of the character specified comprising a container, a meshed strainer element hingedly mounted in the top of said container, a conical strainer element removably mounted over said first strainer element, an upwardly flaring flange around the lower edge of said conical element, a filtering pad interposed between said strainer elements, a domed top section for said container, said top section being open at the top, and a downwardly extending flange on said section arranged to abut the flange on said conical element.

4. A device of the character specified comprising a container, a meshed strainer element hingedly mounted in the top of said container, a conical strainer element removably mounted over said first strainer element, an upwardly flaring flange around the lower edge of said conical element, a filtering pad interposed between said strainer elements, a domed top section for said container, said top section being open at the top, a downwardly extending flange on said section arranged to abut the flange on said conical element, and a hooded element adapted to fit over the opening in said domed section.

GEORGE GILBERT.